A. N. TOWNE.
PNEUMATIC SIGNALING APPARATUS.
No. 189,969.  Patented April 24, 1877.
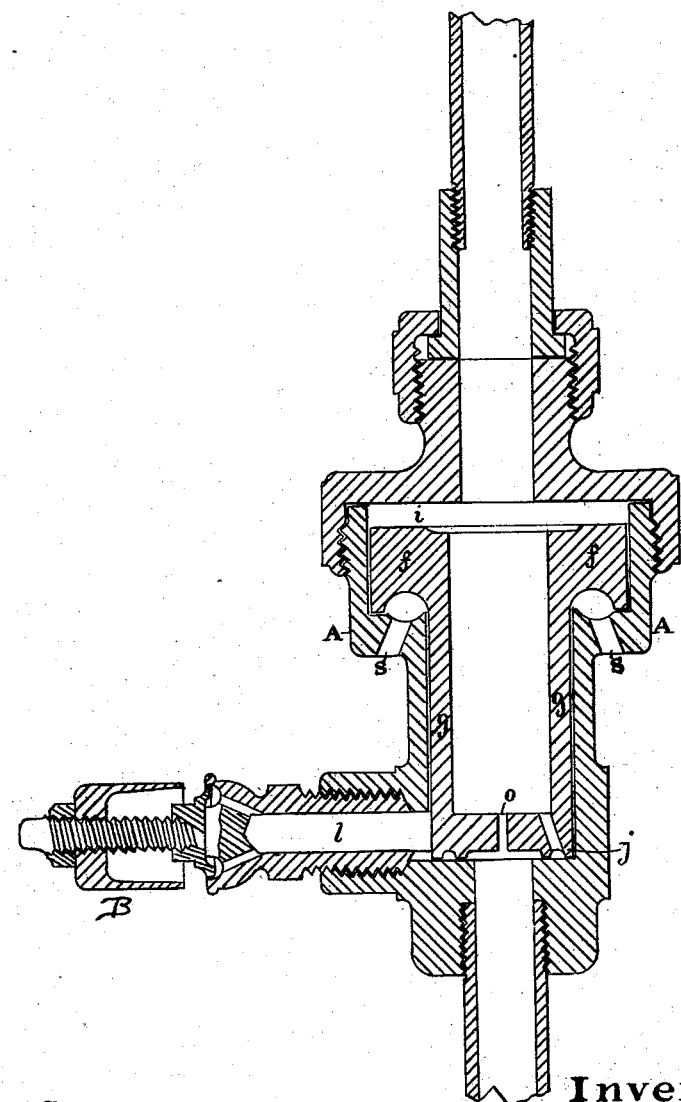
Witnesses
Geo. H. Strong.
Jno. L. Boone
Inventor
Alban N. Towne
by Dewey & Co.
Attys.

UNITED STATES PATENT OFFICE.

ALBAN N. TOWNE, OF SAN FRANCISCO, CALIFORNIA.

IMPROVEMENT IN PNEUMATIC SIGNALING APPARATUS.

Specification forming part of Letters Patent No. 189,969, dated April 24, 1877; application filed March 1, 1877.

*To all whom it may concern:*

Be it known that I, ALBAN N. TOWNE, of the city and county of San Francisco, and State of California, have invented an Automatic Signal for Railway-Trains; and I do hereby declare the following to be a full, clear, and exact description thereof, reference being had to the accompanying drawings.

My invention relates to a novel arrangement for operating a whistle by compressed air for the purpose of sounding signals.

The principal object of my invention is to provide a means by which the conductor of a railway-train can signal the engineer through the medium of a whistle connected with a pipe which contains compressed air, and which passes from the cab throughout the length of the train.

Referring to the accompanying drawings for a more complete explanation of my invention, Figure 1 is a section of my signal.

A represents the cage, inside of which I place a valve, to be hereinafter described, and to which I attach a whistle, B, which in the present instance is represented as an ordinary steam-whistle. This cage I secure at the desired point in the length of a pipe which leads from a reservoir in which compressed air is contained, so that it forms a portion of the pipe. In the case of a railway-train the drum or reservoir will be located below the cab or tender, as preferred, and will lead up into or through the cab of the train, suitable couplings being employed to connect the pipes between the cars. The cage A I connect with the air-pipe inside of the cab, so that it forms a portion of the length of the pipe, the lower end of the cage being connected to the tube which leads from the drum or reservoir of compressed air, while the upper end is connected with the tube which leads back through the train. Inside of the cage I place a valve, which consists of a head, *f*, and stem *g*. The head is larger is diameter than the stem. The chamber in which this valve is placed is made to correspond with the shape of the valve— that is, the head *f* fits in an enlarged upper part of the chamber, while the stem fits in a reduced or lower part. The upper or enlarged part of the chamber is deeper than the thickness of the head, so that a space, *i*, will be left above the head of the valve when it rests upon its seat. It will be noticed that this valve has two seats, one at the lower end of the stem and another on the shoulder, which is formed by the projection of the enlarged head. If it is desired to lighten the valve it can be bored out, so as to leave only a narrow partition, *j*, at the lower end. *o* is a small hole or passage, which leads through the partition *j* or valve, as the case may be, through which a limited quantity of air can pass from below the valve to the pipe above it. The whistle K I secure to the cage, near the lower end of the valve or stem. The port or passage *l*, which conducts air to the whistle, communicates with the chamber in which the stem of the valve fits, a short distance above the lower end of the stem, so that when the valve is raised air can pass from the lower pipe to the whistle; but when the valve is down the stem covers the passage and cuts off the air from the whistle.

It will be evident that when the cage is thus connected with the air-pipe air will pass up through the hole or passage O in the valve until the pressure above and below the valve is equal, and, as the area of the head or upper end of the valve is larger than the area of the lower end, the pressure upon the largest area will keep the valve to its seats and close the air-passage to the whistle.

The tube, which passes through the train, I provide with suitable connections between the cars, and arrange suitable stop-valves within reach of the conductor. By opening one of these stop-valves the escape of air from the tube which connects with the upper end of the cage will relieve the pressure on the head or upper end of the valve, so that the pressure below will lift the valve and allow air to pass to the whistle through the passage *l*. When the outflow of air through the stop-valve is cut off the air regains its equilibrium in the pipes through the passage O in the valve, and the valve is again pressed down upon its seat and the escape of air to the whistle cut off. A spring could be used, if preferred, to press the valve down upon its seats. Openings S S are made from the upper valve-seat, so as to communicate with the open air for the purpose of releasing any accumulation of air which might otherwise prevent the valve from coming back to its seat.

This arrangement for signaling on railway-trains will be much more convenient than the ordinary bell and bell-rope signal. Each car will have a tube connected with it, either under, above, or passing through the car, and suitable flexible tubes or joints can be used for connecting them in the ordinary manner of connecting such tubes. Should the train become accidentally disconnected or broken, the breaking of the train-tube would permit the air to escape and the whistle would be sounded, thus notifying the engineer of the fact.

Having thus described my invention, what I claim, and desire to secure by Letters Patent, is—

The double-seated valve, consisting of the enlarged head $f$ and stem $g$, with its limited passage O, in combination with a cage, A, constructed to correspond with the shape of the valve, and within which said valve operates, said cage being provided with the opening or openings S and a whistle or other pneumatic signal, substantially as and for the purpose specified.

In witness whereof I have hereunto set my hand and seal.

ALBAN N. TOWNE. [L. S.]

Witnesses:
GEO. H. STRONG,
FRANK A. BROOKS.